United States Patent
Oono

(10) Patent No.: US 7,495,790 B2
(45) Date of Patent: Feb. 24, 2009

(54) REMOVING THE REGISTRATION OF THE PRINTER MEETING A PRESCRIBED CONDITION, IF THE OBTAINED REGISTERED NUMBER EXCEEDS A PRESCRIBED VALUE

(75) Inventor: Yoshihito Oono, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 932 days.

(21) Appl. No.: 10/936,588

(22) Filed: Sep. 9, 2004

(65) Prior Publication Data

US 2005/0206938 A1    Sep. 22, 2005

(30) Foreign Application Priority Data

Mar. 22, 2004    (JP)    ............................. 2004-082796

(51) Int. Cl.
*G06F 3/12*    (2006.01)
*G06F 15/00*    (2006.01)

(52) U.S. Cl. ..................................... 358/1.15; 358/1.13

(58) Field of Classification Search ................. 358/1.1, 358/1.2, 1.4, 1.5, 1.6, 1.9, 1.11, 1.12, 1.13, 358/1.14, 1.15, 1.16, 1.17, 1.18, 407, 468, 358/400, 401, 437; 399/1, 2, 8; 347/1, 2, 347/3, 5, 14, 23
See application file for complete search history.

(56) References Cited

U.S. PATENT DOCUMENTS

2005/0207763 A1 * 9/2005 Chihara ....................... 399/24

FOREIGN PATENT DOCUMENTS

JP    A 2001-306278    11/2001
KR    2004013739 A  *  2/2004

\* cited by examiner

*Primary Examiner*—Dov Popovici
(74) *Attorney, Agent, or Firm*—Oliff & Berridge, PLC

(57) ABSTRACT

A printer management method for managing printers available for an information processing apparatus, includes a step of obtaining the number of the printers registered to the information processing apparatus; and a step of removing the registration of the printer meeting a prescribed condition, if the obtained registered number exceeds a prescribed value.

15 Claims, 8 Drawing Sheets

REMOVING THE REGISTRATION OF THE PRINTER MEETING A PRESCRIBED CONDITION, IF THE OBTAINED REGISTERED NUMBER EXCEEDS A PRESCRIBED VALUE

FIELD OF THE INVENTION

The present invention relates to a printer management method, a printer management apparatus, and a program for printer management, and more particularly to a printer management method, a printer management apparatus, and a program for printer management that manage printers usable in an information processing apparatus.

BACKGROUND ART

Recently, as network technology has been developed and spread widely, there are increasing occasions where information processing apparatuses such as PC's (personal computers) are connected with printers via a network, and the information processing apparatuses use the printers through the network.

When a plurality of information processing apparatuses are connected with a plurality of printers through the network, these information processing apparatuses can share one of the plurality of the printers, and also each of the information processing apparatuses can use the plurality of printers. Therefore, recently, information processing apparatus tends to register a plurality of printers as available printers. This tendency is more significant for portable information processing apparatuses. In such a portable information processing apparatus, a plurality of printers are registered depending on the networks with which the portable information processing apparatus is connected.

However, the printers registered to the information processing apparatus, once they are used, are not always used again. Some printers are never used again. However, such printers that are never used again are kept to be registered to the information processing apparatus as unnecessary printers. These unnecessary printers may act as a disturbance in selecting a printer to be used.

To cope with the above problem, such a technology has been proposed that when an information processing apparatus carries out print processing and completes the print processing, a printer driver used in the print processing is uninstalled so as to avoid an increase of unnecessary printers (see Japanese patent application publication No. 2001-306278, for example).

As describe above, in the technology described in the Japanese patent application publication No. 2001-306278, the printer driver which has been used in a print processing is uninstalled when the print processing is completed. Therefore, for a printer to be used plural times, it is necessary to install a printer driver of the printer each time the print processing is carried out.

It is further proposed that the technology described in the Japanese patent application publication No. 2001-306278 is modified so that the printer driver is uninstalled when the print processing has been carried out prescribed plural times. However, the frequency of use differs between daily-used printers and other printers. Therefore, this modified technology is not adequate for the situations in which such daily-used printers exist in the registered printers.

SUMMARY OF THE INVENTION

The present invention has been made in view of the above circumstances and provides a printer management method, a printer management apparatus, and a program for printer management that determine printers to be removed from the registration based on the various conditions such as situations of using printers, thereby preventing unnecessary printers from being kept to be registered to an information processing apparatus.

According to an aspect of the present invention, a printer management method for managing printers available for an information processing apparatus is configured as comprising the steps of obtaining the number of the printers registered to the information processing apparatus; and removing the registration of the printer meeting a prescribed condition, if the obtained registered number exceeds a prescribed value.

With the above configuration, if the number of the printers registered to the information processing apparatus exceeds the prescribed value, the printers that meet a prescribed condition are removed from the registrations. As a result, in selecting a printer for use in a print processing, the selection operations are not obstructed by unnecessary printers.

BRIEF DESCRIPTION OF THE DRAWINGS

Preferred embodiments of the present invention will be described in detail based on the following drawings, wherein.

DESCRIPTION OF THE EMBODIMENTS

A detailed description will now be given of embodiments of a printer management method, a printer management apparatus, and a program for printer management according to the present invention with reference to accompanying drawings.

First Embodiment

Figure 1:
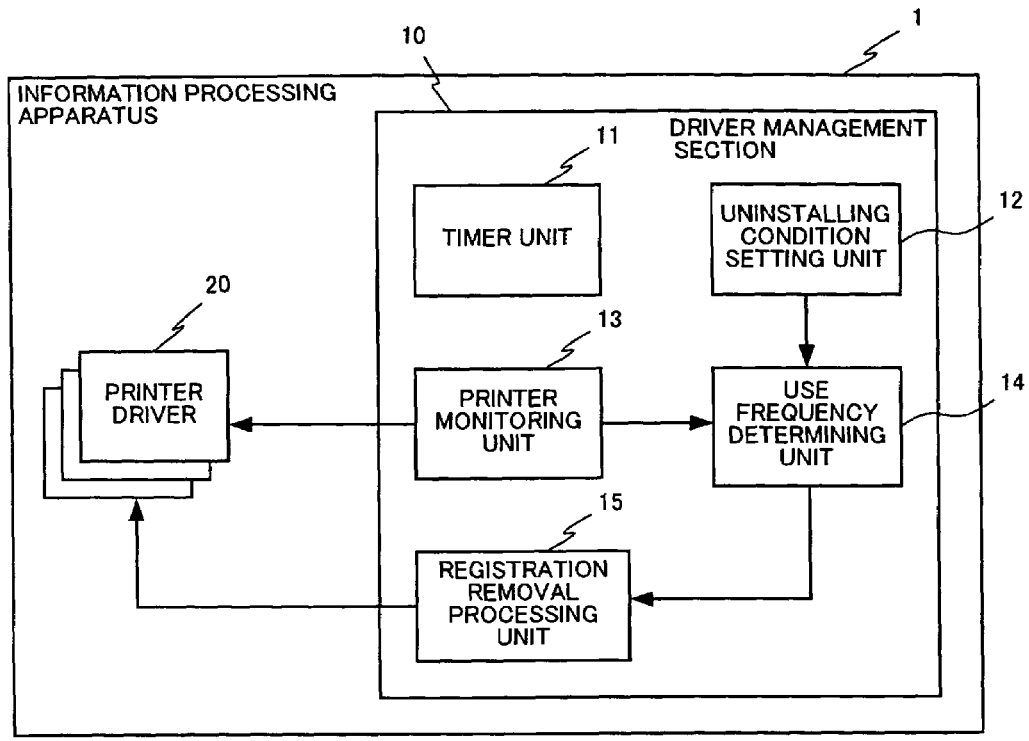
FIG. 1 is a block diagram illustrating a functional configuration of an example an information processing apparatus to which a first embodiment of the present invention is applied.

FIG. 1 is a block diagram illustrating a functional configuration of an information processing apparatus to which a first embodiment of the present invention is applied. As shown in FIG. 1, the information processing apparatus 1 includes a driver management section 10. The driver management section 10 manages printers registered to the information processing apparatus 1 by operating printer drivers 20.

The driver management section 10 comprises a timer unit 11, an uninstalling condition setting unit 12, a printer monitoring unit 13, a use frequency determining unit 14, and a registration removal processing unit 15.

The timer unit 11 measures a time interval for causing the driver management section 10 to periodically carry out management processing for the printer drivers. The uninstalling condition setting unit 12 sets conditions for determining printers that are to be removed from the registration as unnecessary printers. The printer monitoring unit 13 obtains the number of the printer drivers 20 installed on the information processing apparatus 1, and respective frequencies of use of the printer drivers 20. The use frequency determining unit 14 determines printers that are to be removed from the registration as unnecessary printers based on the conditions set by the uninstalling condition setting unit 12, if the number of the printer drivers obtained by the printer monitoring unit 13 exceeds the number set by the uninstalling condition setting unit 12. The registration removal processing unit 15 uninstalls and/or backs up the printer drivers 20 of the printers determined as unnecessary printers by the use frequency determining unit 14, and then removes the registrations of these printers.

The driver management section 10 is operated by causing the information processing apparatus 1 to operate based on a driver management program.

Figure 2:
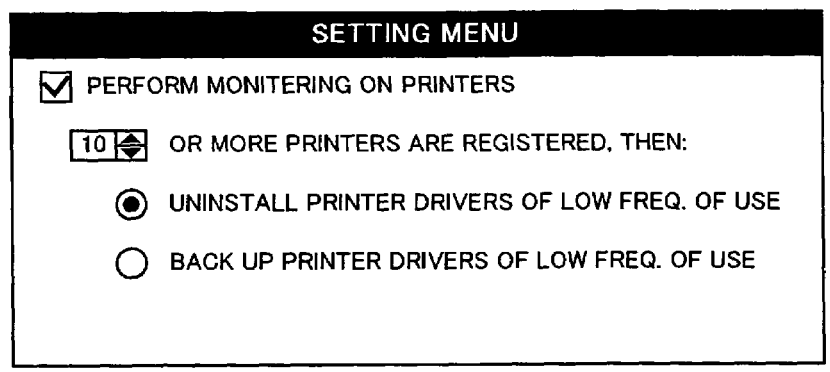
FIG. 2 shows an example of an uninstalling condition setting screen.

A description will now be given of the uninstalling conditions set by the uninstalling condition setting unit 12. FIG. 2 shows an example of an uninstalling condition setting screen.

The uninstalling conditions are set by displaying such an uninstalling condition setting screen as shown in FIG. 2 on a display unit (not shown) of the information processing apparatus 1, and receiving the instructions from a user through the uninstalling condition setting screen. The setting of the uninstalling conditions include a setting as to whether the monitor of the printers, namely the driver management section 10, is used or not, and specifying as to whether the printer drivers of the printers with a low frequency of use are uninstalled and/or backed up, if the number of the registered printers exceeds a threshold for the removal of the printer registrations. The backup of the printer means the processing of storing a group of files constituting the printer driver, and a file in which settings of the printer driver are recorded, in a memory unit (not shown) of the information processing apparatus 1. Then, uninstalling of the printer driver is performed. Thus, the processing allows a subsequent recovery of the printer driver.

Figure 3:
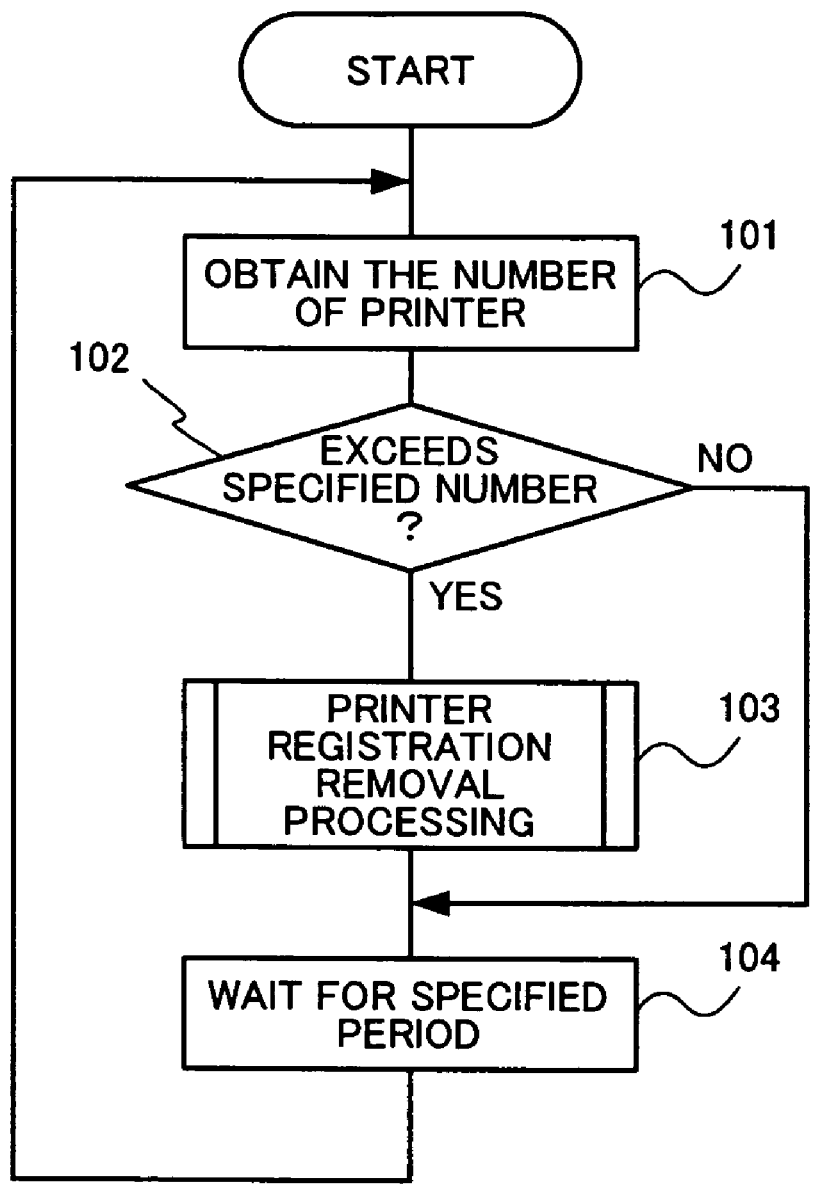
FIG. 3 is a flowchart illustrating a flow of driver management processing by a driver management section 10.

A description will now be given of an operation of the driver management section 10. FIG. 3 is a flowchart illustrating a flow of driver management processing performed by the driver management section 10.

When the driver management section 10 starts the driver management processing, the printer monitoring unit 13 first obtains the number of the printers registered to the information processing apparatus 1, namely the number of the installed printer drivers 20 (step 101). Then, the use frequency determining unit 14 compares the number of the printers obtained by the printer monitoring unit 13 with the number of the printers (threshold) set by the uninstalling condition setting unit 12. If the number of the registered printers exceeds the specified number ("YES" in a step 102), registration removal processing for the printers described later is carried out (step 103), and the operation is waited for a specified time period (step 104). On the other hand, if the number of the registered printers does not exceed the specified number ("NO" in the step 102), the registration removal processing for the printers is not carried out, and the operation is waited for the specified time period (step 104). During the wait of the operation for the specified time period in the step 104, the specified time period is measured by the timer unit 11, and when the specified time period has elapsed, the driver management section 10 returns the operation to the step 101, and repeats the same processing.

Figure 4:
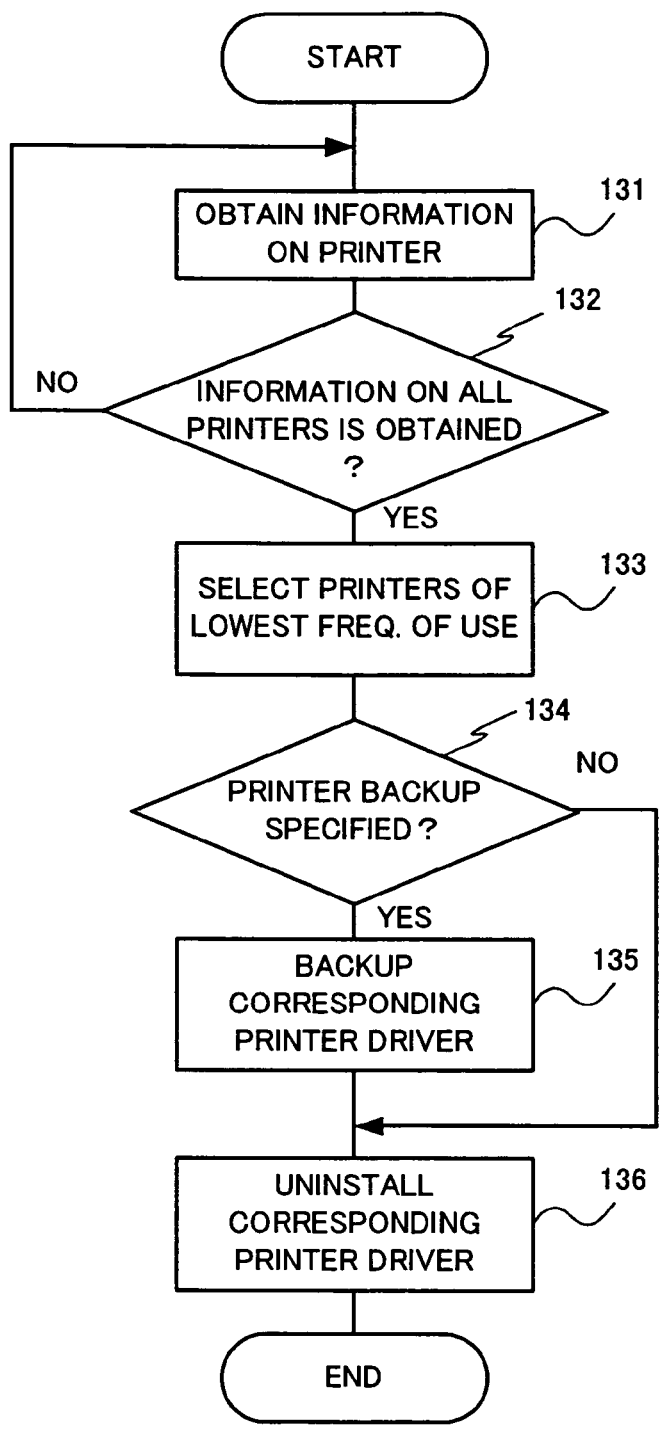
FIG. 4 is a flowchart illustrating a flow of a registration removal processing for printers.

A description will now be given of the registration removal processing in the step 103. FIG. 4 is a flowchart illustrating a flow of the registration removal processing for the printers.

In the registration removal processing for the printers, the printer monitoring unit 13 first obtains printer information on the registered printers (step 131). The printer information includes at least information indicating the frequency of use of the printers. The printer monitoring unit 13 obtains the printer information from all of the registered printers (step 132).

When the printer monitoring unit 13 has obtained the printer information from all the registered printers, the use frequency determining unit 14 selects printers whose frequency of use is the lowest based on the obtained printer information (step 133). Then, if the uninstalling condition setting unit 12 has specified the backup of the printers ("YES" in a step 134), the registration removal processing unit 15 backs up the printer drivers of the selected printers (step 135), and then, uninstalls the printer drivers (step 136). Thus, the registration removal processing for the printers completes. On the other hand, if the uninstalling condition setting unit 12 has specified the uninstallation of the printers ("NO" in the step 134), the registration removal processing unit 15 uninstalls the printer drivers of the selected printers (step 136). Thus, the registration removal processing for the printers completes.

Second Embodiment

Figure 5:
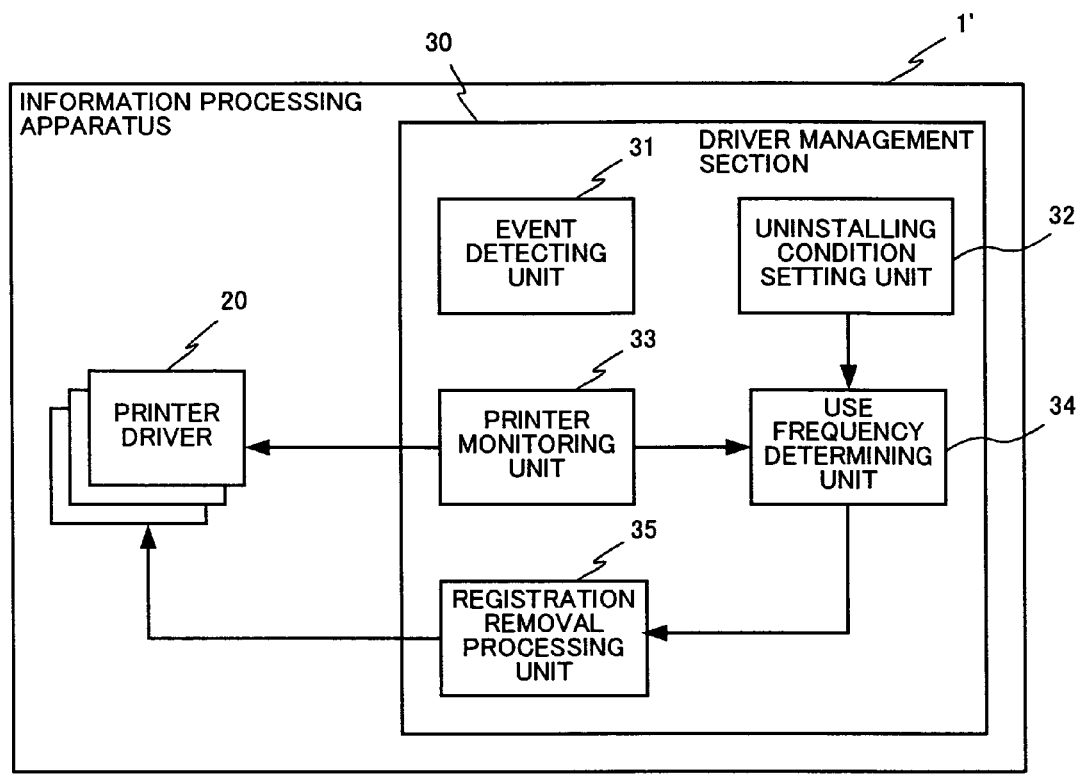
FIG. 5 is a block diagram illustrating a functional configuration of an information processing apparatus in a second embodiment.

FIG. 5 is a block diagram illustrating a functional configuration of an information processing apparatus 1' in a second embodiment. As shown in FIG. 5, the information processing apparatus 1' includes a driver management section 30. The driver management section 30 manages printers registered to the information processing apparatus 1' by operating printer drivers 20.

The driver management section 30 further includes an event detecting unit 31, an uninstalling condition setting unit 32, a printer monitoring unit 33, a use frequency determining unit 34, and a registration removal processing unit 35.

The event detecting unit 31 detects events occurring in the information processing apparatus 1', and especially detects a request for registering a printer from a user. The uninstalling condition setting unit 32, the printer monitoring unit 33, the use frequency determining unit 34, and the registration removal processing unit 35 respectively correspond to the uninstalling condition setting unit 12, the printer monitoring unit 13, the use frequency determining unit 14, and the registration removal processing unit 15 in the first embodiment.

It should be noted that the driver management section 30 is operated by causing the information processing apparatus 1' to operate based on a driver management program. The driver management program may be constituted as a part of an installer which installs the printer driver.

Figure 6:
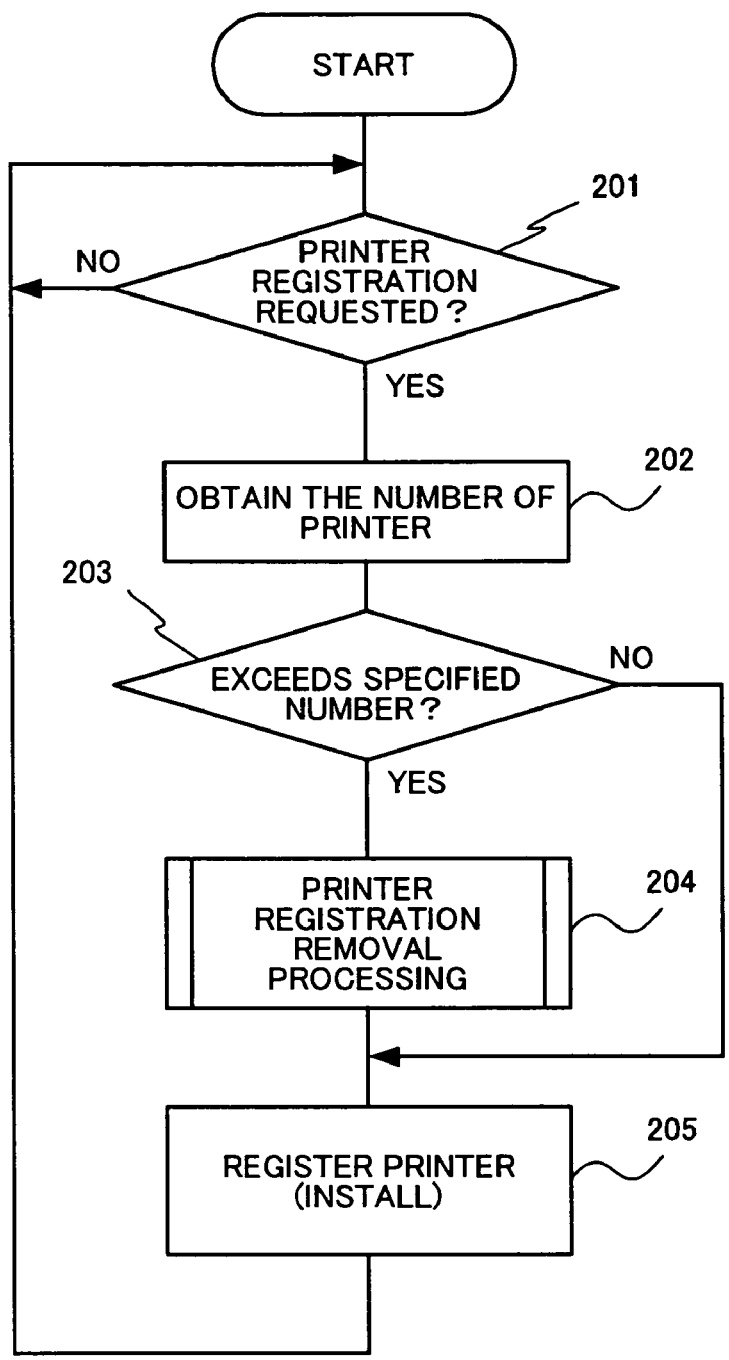
FIG. 6 is a flowchart illustrating a flow of driver management processing by a driver management section 30.

A description will now be given of operations of the driver management section 30. FIG. 6 is a flowchart illustrating a flow of driver management processing by the driver management section 30.

When the driver management section 30 starts the driver management processing, the driver management section 30 first waits until the event detecting unit 31 detects a request for registering a printer from a user ("NO" in a step 201). Then, if the event detecting unit 31 detects the request for registering a printer ("YES" in the step 201), the printer monitoring unit 33 obtains the number of the printers registered to the information processing apparatus 1', namely the number of the registered printer drivers 20 (step 202). Then, the use frequency determining unit 34 compares the number of the printers obtained by the printer monitoring unit 33 with the number of the printers (threshold) set by the uninstalling condition setting unit 32. If the number of the registered printers exceeds the specified number ("YES" in a step 203), registration removal processing for the printers is carried out (step 204). On the other hand, if the number of the registered printers does not exceed the specified number ("NO" in the step 203), the registration removal processing for the printers is not carried out.

If the driver management program realizing the driver management section 30 is constituted as the part of the installer which installs the printer driver, registration processing for a printer is subsequently carried out (step 205).

The registration removal processing for the printers in the step 204 is similar to the registration removal processing for the printers in the first embodiment (see FIG. 4), and thus, a description thereof is omitted.

Third Embodiment

In a third embodiment, a basic configuration of an information processing apparatus is similar to that of the information processing apparatus 1' in the second embodiment (see FIG. 5). Therefore, a description will be given with reference to FIG. 5.

The third embodiment is different from the second embodiment in that, in the third embodiment, the event detecting unit 31 detects execution of print processing based on the printer driver 20.

Further, a driver management program realizing the driver management section 30 in the third embodiment may be constituted as a part of the printer driver.

Figure 7:
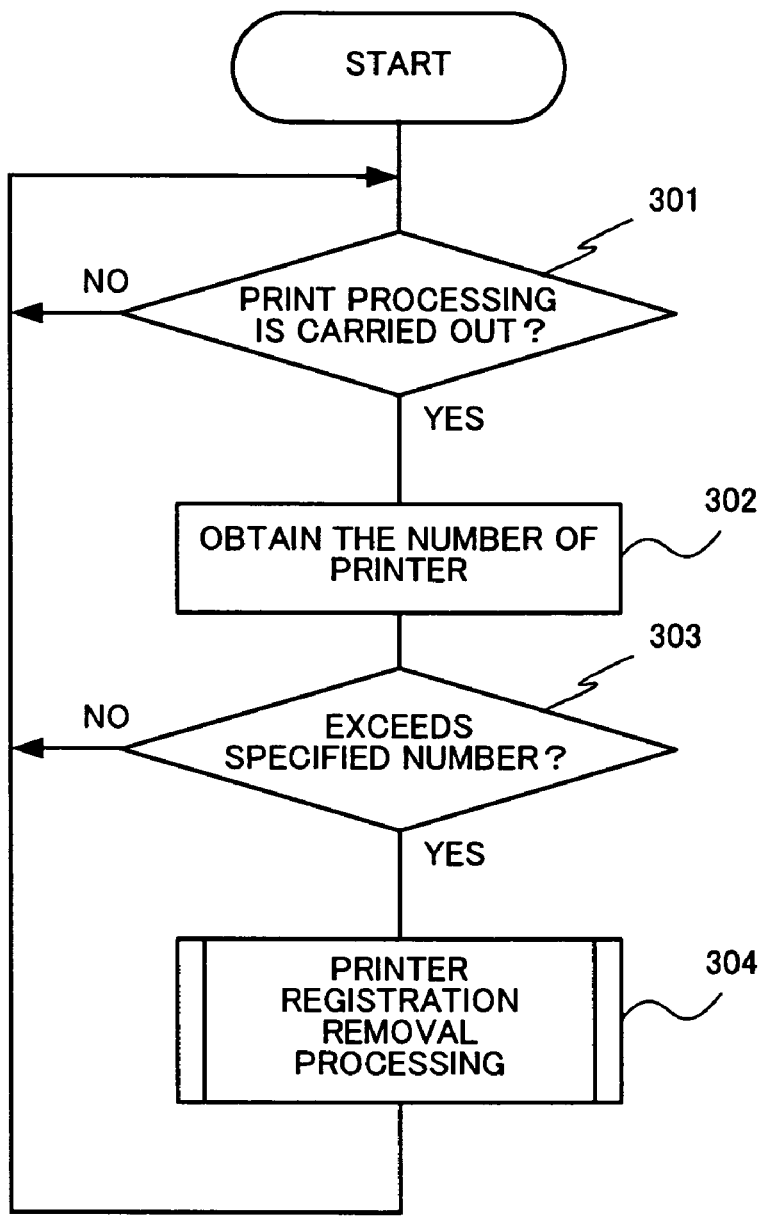
FIG. 7 is a flowchart illustrating a flow of driver management processing according to a third embodiment.

A description will now be given of operations of the driver management section 30 in the third embodiment. FIG. 7 is a flowchart illustrating a flow of driver management processing in the third embodiment.

When the driver management section 30 starts the driver management processing, the driver management section 30 first waits until the event detecting unit 31 detects the print processing carried out by the information processing apparatus 1' ("NO" in a step 301). Then, when the event detecting unit 31 detects that the print processing has been carried out ("YES" in the step 301), the printer monitoring unit 33 obtains the number of the printers registered to the information processing apparatus 1', namely the number of the registered printer drivers 20 (step 302). Then, the use frequency determining unit 34 compares the number of the printers obtained by the printer monitoring unit 33 with the number of the printers (threshold) set by the uninstalling condition setting unit 32. If the number of the registered printers exceeds the specified number ("YES" in a step 303), registration removal processing for the printers is carried out (step 304). On the other hand, if the number of the registered printers does not exceed the specified number ("NO" in the step 303), the registration removal processing for the printers is not carried out.

The registration removal processing for the printers in the step 304 is similar to the registration removal processing for the printers in the first embodiment (see FIG. 4), and thus, a description thereof is omitted.

Fourth Embodiment

In a fourth embodiment, a description will be given of a case where conditions other than the frequency of use of the printer may also be set as the uninstalling conditions for removing the registration of the printer. Although the uninstalling conditions other than the frequency of use of the printer may be set in the respective above-described embodiments, a description will now be given of a case where the uninstalling conditions other than the frequency of use of the printer are set for the configuration of the first embodiment.

Figure 8:
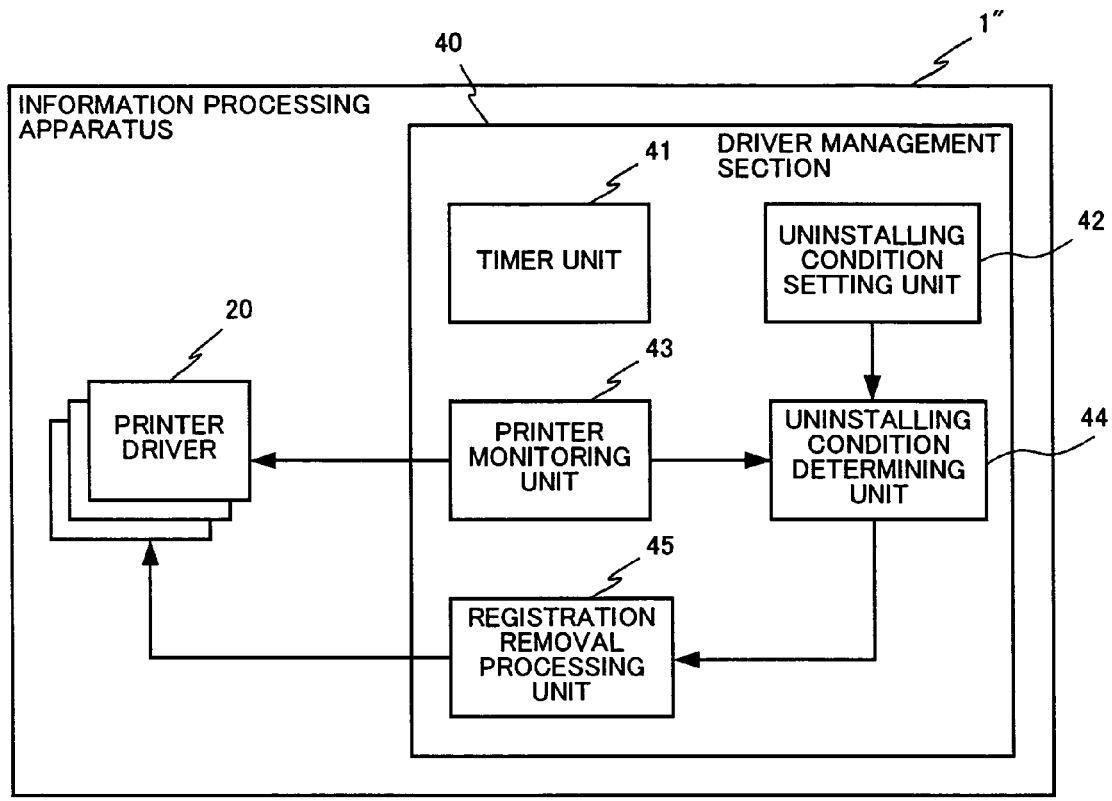
FIG. 8 is a block diagram illustrating a functional configuration of an information processing apparatus in a fourth embodiment.

FIG. 8 is a block diagram illustrating a functional configuration of an information processing apparatus 1" in the fourth embodiment. As shown in FIG. 8, the information processing apparatus 1" includes a driver management section 40. The driver management section 40 manages printers registered to the information processing apparatus 1" by operating printer drivers 20.

The driver management section 40 further includes a timer unit 41, an uninstalling condition setting unit 42, a printer monitoring unit 43, an uninstalling condition determining section 44, and a registration removal processing unit 45.

The timer unit 41, the uninstalling condition setting unit 42, the printer monitoring unit 43, the uninstalling condition determining section 44, and the registration removal processing unit 45 basically correspond to the timer unit 11, the uninstalling condition setting unit 12, the printer monitoring unit 13, the use frequency determining unit 14, and the registration removal processing unit 15 in the first embodiment respectively. However, the uninstalling conditions set by the uninstalling condition setting unit 42 and the determination processing performed by the uninstalling condition determining section 44 are different from those in the first embodiment. The different portions will be described below.

Figure 9:
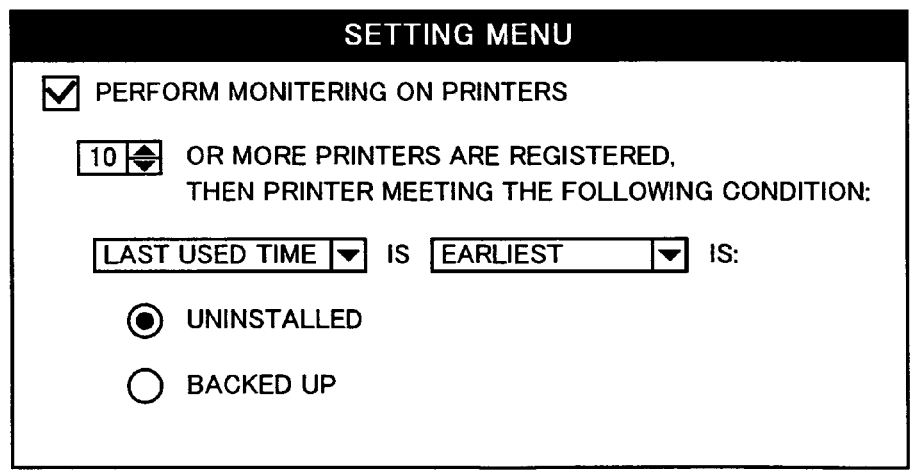
FIG. 9 shows an example of an uninstalling condition setting screen in the fourth embodiment.

A description will now be given of the uninstalling conditions set by the uninstalling condition setting unit 42. FIG. 9 shows an example of an uninstalling condition setting screen in the fourth embodiment.

The uninstalling conditions are set by displaying such an uninstalling condition setting screen as shown in FIG. 9 on a display unit (not shown) of the information processing apparatus 1", and receiving instructions from a user though the uninstalling condition setting screen. The setting of the uninstalling conditions include a setting as to whether the monitor of the printers, namely the driver management section 10, is used or not, a setting as to what conditions are used for selecting the printers, and specifying as to whether the printer drives of the selected printers are uninstalled and/or backed up, if the number of the registered printers exceeds a threshold for the removal of the printer registrations.

The conditions for selecting the printers may include "time and date on which the printer is used last", "time and date of the registration of the printer", "the same type of printers are registered", and the like, and values of the respective conditions may be specified.

Figure 10:
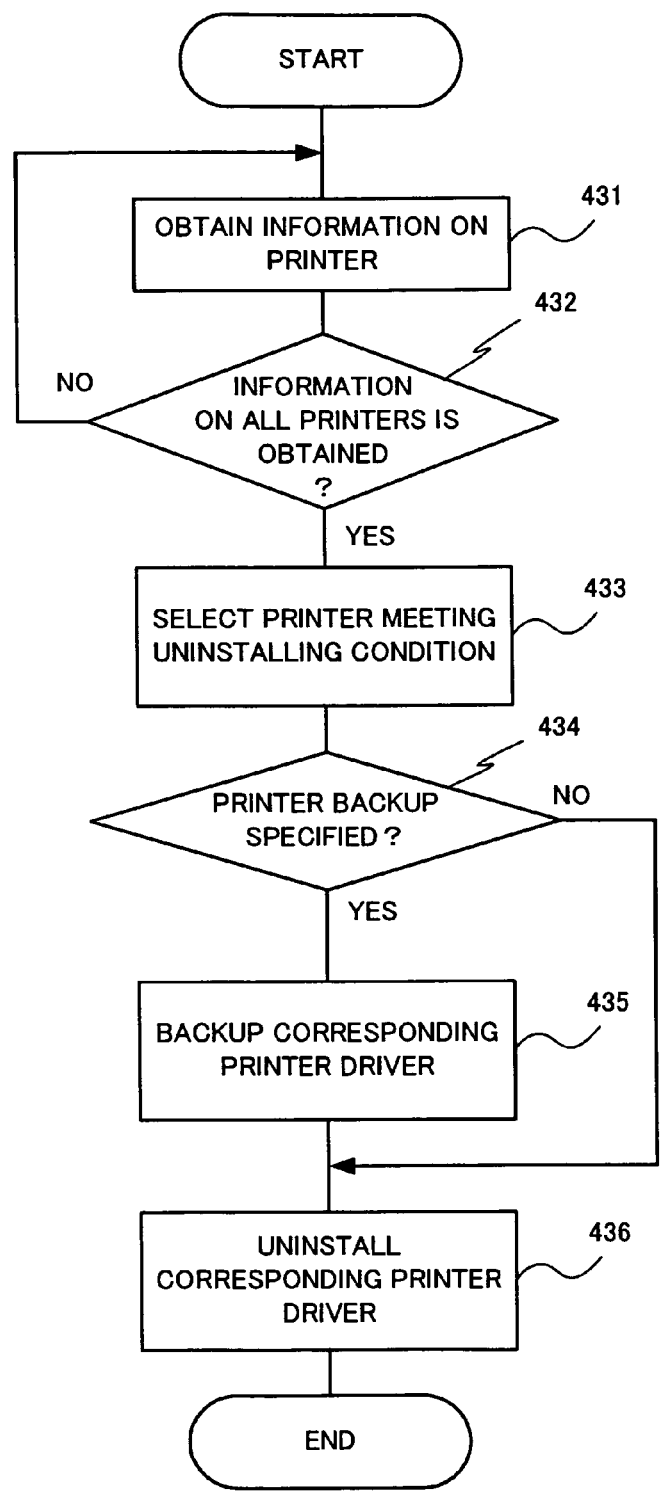
FIG. 10 is a flowchart illustrating a flow of a registration removal processing for printers in the fourth embodiment.

A description will now be given of operations of the driver management section 40. The operations of the driver management section 40 are similar to those of the driver management section 10 in the first embodiment except for the registration removal processing for the printers, and thus, a description will be given only of operations of the registration removal processing for the printers. FIG. 10 is a flowchart illustrating a flow of the registration removal processing for the printers in the fourth embodiment.

In the registration removal processing for the printers, the printer monitoring unit 43 first obtains printer information on the registered printers (step 431). The printer information includes information indicating the frequency of use of the printers and information indicating the registered time and data, and the time and date on which the printer used last. The printer monitoring unit 43 obtains the printer information from all the registered printers (step 432).

When the printer monitoring unit 43 has obtained the printer information from all the registered printers, the uninstalling condition determining section 44 selects printers which meet the selection conditions based on the obtained printer information and the selection conditions for the printers set by the uninstalling condition setting unit 42 (step 433). Then, if the uninstalling condition setting unit 42 has specified the backup of the printers ("YES" in the step 434), the registration removal processing unit 45 backs up the printer drivers of the selected printers (step 435), and then, uninstalls the printer drivers (step 436). Thus, the registration removal processing for the printers completes. On the other hand, if the uninstalling condition setting unit 42 has specified the removal of the registration of the printers ("NO" in the step 434), the registration removal processing unit 45 uninstalls the printer drivers of the selected printers (step 436). Thus, the registration removal processing for the printers completes.

What is claimed is:

1. A printer management method for managing printers available for an information processing apparatus, comprising:
    obtaining a number of the printers registered to the information processing apparatus; and
    removing a registration of a printer meeting a prescribed condition, if an obtained registered number exceeds a prescribed value.

2. The printer management method according to claim 1, wherein the removing of a registration of a printer comprises uninstalling a printer driver corresponding to the printer.

3. The printer management method according to claim 1, wherein the removing a registration of a printer comprises:
    backing up a group of files of a printer driver corresponding to the printer and a file that records a setting of the printer driver, and then
    uninstalling the printer driver.

4. The printer management method according to claim 1, wherein the prescribed condition is that a frequency of use of the printer is the lowest.

5. The printer management method according to claim 1, wherein the prescribed condition is that the printer has a longest elapsed time since the printer was last used.

6. A printer management apparatus for managing printers available for an information processing apparatus comprising:
    printer monitoring means for obtaining a number of the printers registered to the information processing apparatus;
    condition determining means for determining a printer which meets a prescribed condition, if a registered number obtained by the printer monitoring means exceeds a prescribed value; and
    registration removing means for removing a registration of a printer determined by the condition determining means.

7. The printer management apparatus according to claim 6, wherein the registration removing means removes a registration of a printer by uninstalling a printer driver corresponding to a printer determined by the condition determining means.

8. The printer management apparatus according to claim 6, wherein the registration removing means removes the registration of the printer by backing up a group of files of a printer driver corresponding to the printer and a file in which a setting of the printer driver is recorded, and then, uninstalling the printer driver.

9. The printer management apparatus according to claim 6, wherein the prescribed condition is that a frequency of use of the printer is the lowest.

10. The printer management apparatus according to claim 6, wherein the prescribed condition is that the printer has a longest elapsed time since the printer was last used.

11. A computer readable storage medium encoded with a printer management program for causing an information processing apparatus to manage printers available for the information processing apparatus, the program comprising:
    a printer monitoring process for obtaining a number of the printers registered to the information processing apparatus;
    a condition determining process for determining a printer which meets a prescribed condition, if a registered number obtained by the printer monitoring process exceeds a prescribed value; and
    a registration removing process for removing a registration of a printer determined by the condition determining process.

12. The computer readable storage medium encoded with the printer management program according to claim 11, wherein the registration removing process removes the registration of the printer by uninstalling a printer driver corresponding to the printer.

13. The computer readable storage medium encoded with the printer management program according to claim 11, wherein the registration removing process removes the registration of the printer by backing up a group of files of a printer driver corresponding to the printer and a file in which a setting of the printer driver is recorded, and then, uninstalling the printer driver.

14. The computer readable storage medium encoded with the printer management program according to claim 11, wherein the prescribed condition is that a frequency of use of the printer is the lowest.

15. The computer readable storage medium encoded with the printer management program according to claim 11, wherein the prescribed condition is that the printer has a longest elapsed time since the printer was last used.

* * * * *